(No Model.)
J. HOWARD.
Corn and Cotton Planter.
No. 232,501. Patented Sept. 21, 1880.
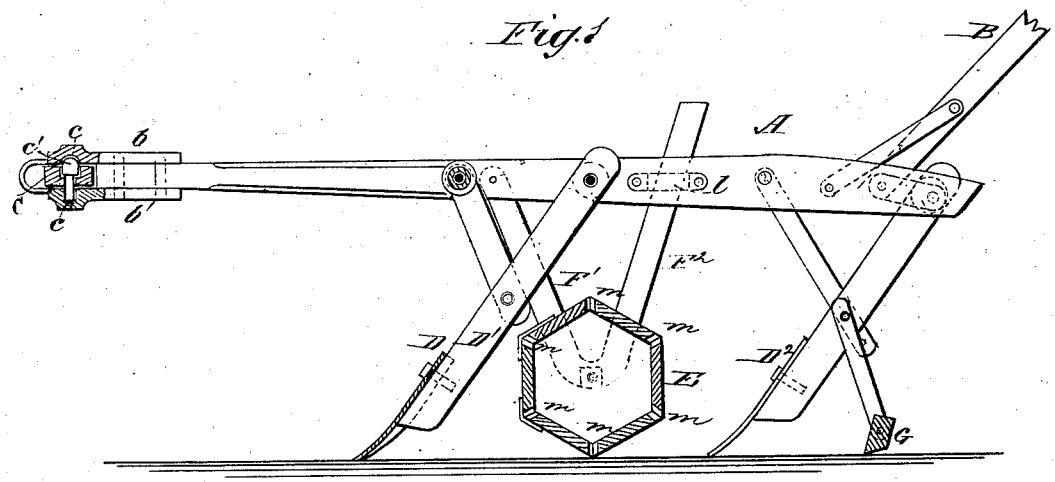
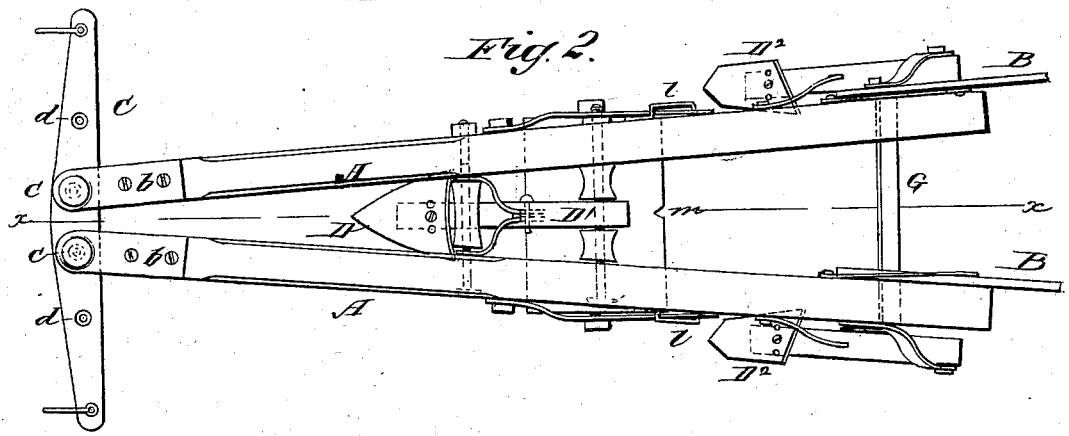
WITNESSES:
Francis McArdle
C. Sedgwick
INVENTOR:
J. Howard
BY Munn & Co.
ATTORNEYS.

UNITED STATES PATENT OFFICE.

JOSEPH HOWARD, OF BRYAN, TEXAS.

CORN AND COTTON PLANTER.

SPECIFICATION forming part of Letters Patent No. 232,501, dated September 21, 1880.

Application filed May 11, 1880. (No model.)

*To all whom it may concern:*

Be it known that I, JOS. HOWARD, of Bryan, in the county of Brazos and State of Texas, have invented a new and useful Improvement in Corn and Cotton Planters; and I do hereby declare that the following is a full, clear, and exact description of the same.

My invention is an improvement in the class of rolling-hopper planters; and it consists in the construction and arrangement of the devices whereby the hopper is attached to the beams or frame of the machine, and as hereinafter described.

In accompanying drawings, Figure 1 is a longitudinal vertical section on line $x\ x$, Fig. 2, of my improved machine ready for use, and Fig. 2 is a plan view of the same.

The straight beams A are connected at the rear end by cross-bar G, and provided with handles B B. At the forward ends the beams A A are connected to the double-tree C, to which they are attached by metal straps $b\ b'$ and pins $c'\ c'$. The straps $b\ b'$ are applied, respectively, to the upper and under side of the beams A, and project beyond the beams of the latter.

The hexagonal hopper E has discharge-apertures $m$, and is pivoted at each end at the angle of V-shaped arms $F'\ F^2$. The upper ends of the forward arms, $F'$, are pivoted to the beams A, and their rear arms, $F^2$, pass through rigid keepers $l$, fixed on the sides of the beams. Said rear ends, $F^2$, of the arms have thus entire freedom of movement vertically in the keepers $l$, so that the hopper E is allowed to rise and fall as it rolls along, following the undulations of the ground-surface, yet the hopper is held rigidly as to endwise movement, so that in traveling on a curve or turning at corners the hopper may be dragged on the ground without danger of its attachment to the beams being broken.

The furrow to receive the seed is opened by the plow D, attached to standard $D'$, and the furrow is closed by other plows and the seed covered by the scraper G.

I am aware that a rolling hopper has been pivoted to a planter-frame by means of a link or bars, and that such hoppers have been allowed free vertical movement by reason of being journaled in slotted guides. Such construction I do not claim.

What I do claim is—

The combination, with hexagonal rolling hopper and plow-beams, of the V-shaped suspending and guiding arms $F'\ F^2$, one end of which is pivoted and the other plays free in keepers $l$, attached to the beams, as shown and described, for the purpose specified.

JOSEPH HOWARD.

Witnesses:
F. C. JANETTI,
B. F. McKEY.